United States Patent
Gonzalez et al.

(10) Patent No.: US 7,636,427 B2
(45) Date of Patent: Dec. 22, 2009

(54) METHOD AND SYSTEM FOR CONNECTING TWO OR MORE PERSONS BY TELEPHONE

(75) Inventors: Jean Gonzalez, Antibes (FR); Frederic Bojman, Suresnes (FR)

(73) Assignee: France Telecom, Paris (FR)

( * ) Notice: Subject to any disclaimer, the term of this patent is extended or adjusted under 35 U.S.C. 154(b) by 785 days.

(21) Appl. No.: 11/068,318

(22) Filed: Feb. 28, 2005

(65) Prior Publication Data

US 2005/0190896 A1    Sep. 1, 2005

(30) Foreign Application Priority Data

Mar. 1, 2004    (FR)   ................................... 04 50399

(51) Int. Cl.
*H04M 1/64*    (2006.01)
(52) U.S. Cl. .................. 379/88.16; 348/14.08; 370/263; 370/352; 379/201.01; 379/202.01; 379/211.01; 709/223
(58) Field of Classification Search ................. 370/260, 370/261, 352, 263; 379/88.16, 202.01, 88.06, 379/201.01, 211.01; 709/223; 348/14.08
See application file for complete search history.

(56) References Cited

U.S. PATENT DOCUMENTS

| | | | | |
|---|---|---|---|---|
| 5,465,167 A | * | 11/1995 | Cooper et al. ................ 358/468 |
| 5,590,184 A | * | 12/1996 | London .................. 379/142.09 |
| 5,751,760 A | * | 5/1998 | Fuller et al. ............. 379/211.01 |
| 5,949,763 A | * | 9/1999 | Lund ........................... 370/261 |
| 6,272,214 B1 | * | 8/2001 | Jonsson .................. 379/202.01 |
| 6,920,212 B2 | * | 7/2005 | Stern et al. ............. 379/202.01 |
| 7,308,090 B2 | * | 12/2007 | White et al. ............ 379/202.01 |
| 7,376,129 B2 | * | 5/2008 | Acharya et al. .............. 370/352 |
| 7,420,935 B2 | * | 9/2008 | Virolainen ................... 370/263 |
| 7,447,756 B2 | * | 11/2008 | Malik .......................... 709/223 |
| 7,469,043 B1 | * | 12/2008 | McDonald et al. ..... 379/202.01 |
| 2002/0122391 A1 | | 9/2002 | Shalit |
| 2004/0246332 A1 | * | 12/2004 | Crouch ..................... 348/14.08 |
| 2006/0250987 A1 | * | 11/2006 | White et al. ................. 370/260 |

FOREIGN PATENT DOCUMENTS

| | | |
|---|---|---|
| FR | 2 608 875 | 12/1986 |
| FR | 2 640 451 | 12/1988 |
| WO | WO 01/31903 | 5/2001 |

* cited by examiner

*Primary Examiner*—Gerald Gauthier
(74) *Attorney, Agent, or Firm*—Cohen Pontani Lieberman & Pavane LLP

(57) ABSTRACT

Connecting two or more persons by telephone without any person having to give their telephone coordinates. A messaging server adapted to send to one or more invited persons a message sent by an inviting person and containing an invitation to communicate by telephone, to create automatically a number dedicated to a telephone call in which at least one invited person has agreed to participate, and to broadcast the dedicated number to the inviting person and to the invited person(s) who have agreed to participate. An exchange is adapted to connect at least two calls to the dedicated number.

6 Claims, 4 Drawing Sheets

METHOD AND SYSTEM FOR CONNECTING TWO OR MORE PERSONS BY TELEPHONE

FIELD OF THE INVENTION

The invention relates to interpersonal telecommunication.

BACKGROUND OF THE INVENTION

Prior art telecommunications means include the telephone, which provides an essentially voice connection between two or more persons, one of whom calls the other by means of a telephone number. This type of communication is effected by means of a fixed or mobile telephone and enables a call to be made quickly from any location and by means of a compact device, and provides virtual contact with the called person, whose voice can be recognized. Having to disclose one's telephone number in order that one may be called means that true anonymity cannot be preserved.

Other telecommunications means are expanding rapidly at this time, including electronic messaging using local area or wide area packet transmission networks such as the Internet. In asynchronous electronic messaging, the receiver logs onto a server to receive a message "off line". In synchronous electronic messaging, two or more parties are connected simultaneously to a server to enable one party to receive instantaneously messages sent by another party. When communicating on a large scale like this, some users prefer to use a pseudonym to preserve their anonymity to protect their privacy.

There are many personal reasons why an electronic messaging user might wish to communicate with other messaging users by telephone.

Some instantaneous electronic messaging services, such as Internet chat rooms, allow the exchange of telephone numbers by means of asynchronous messaging. This has the drawbacks of interrupting continuity of service and of disclosing the user's telephone number to persons who are obviously not well known to the user as yet.

Some instantaneous electronic messaging services give out a telephone number that is valid only during a session. However, this service is not automated and the user must send the number himself. The possibility of the number being re-used is also a problem.

It is possible to use a telephone meeting gateway that generally has a permanent telephone number, although there is no facility for its automatic transmission. The number may be re-used and thereby disturb the service.

A need is making itself felt for using the many telecommunications means currently on offer without encountering the problems referred to above.

SUMMARY OF THE INVENTION

A first aspect of the invention is directed to a method of connecting two or more persons by telephone without any person having to give their telephone coordinates. An inviting person sends one or more invited persons a message containing an invitation to communicate by telephone. A number dedicated to a telephone call in which one or more invited persons have agreed to participate is automatically created. The dedicated number is broadcast to the inviting person and to the invited person(s) who have agreed to participate, and two or more calls are connected through to the dedicated number.

The connection of two or more calls through to the dedicated number can be controlled by means of a predetermined time period in which the dedicated number is valid.

In particular, the dedicated number is destroyed after use.

A second aspect of the invention is directed to a system for connecting two or more persons by telephone without any person having to give their telephone. The system includes a messaging server adapted to send one or more invited persons a message sent by an inviting person and containing an invitation to communicate by telephone, to create automatically a number dedicated to a telephone call in which one or more invited persons have agreed to participate, and to broadcast the dedicated number to the inviting person and to the invited person(s) who have agreed to participate. The system also includes an exchange adapted to connect two or more calls through to the dedicated number.

The exchange can be adapted to control the connection of two or more calls through to the dedicated number by means of a predetermined time period in which the dedicated number is valid.

The exchange can be adapted to destroy the dedicated number after use.

DETAILED DESCRIPTION OF THE DRAWINGS

Figure 1:
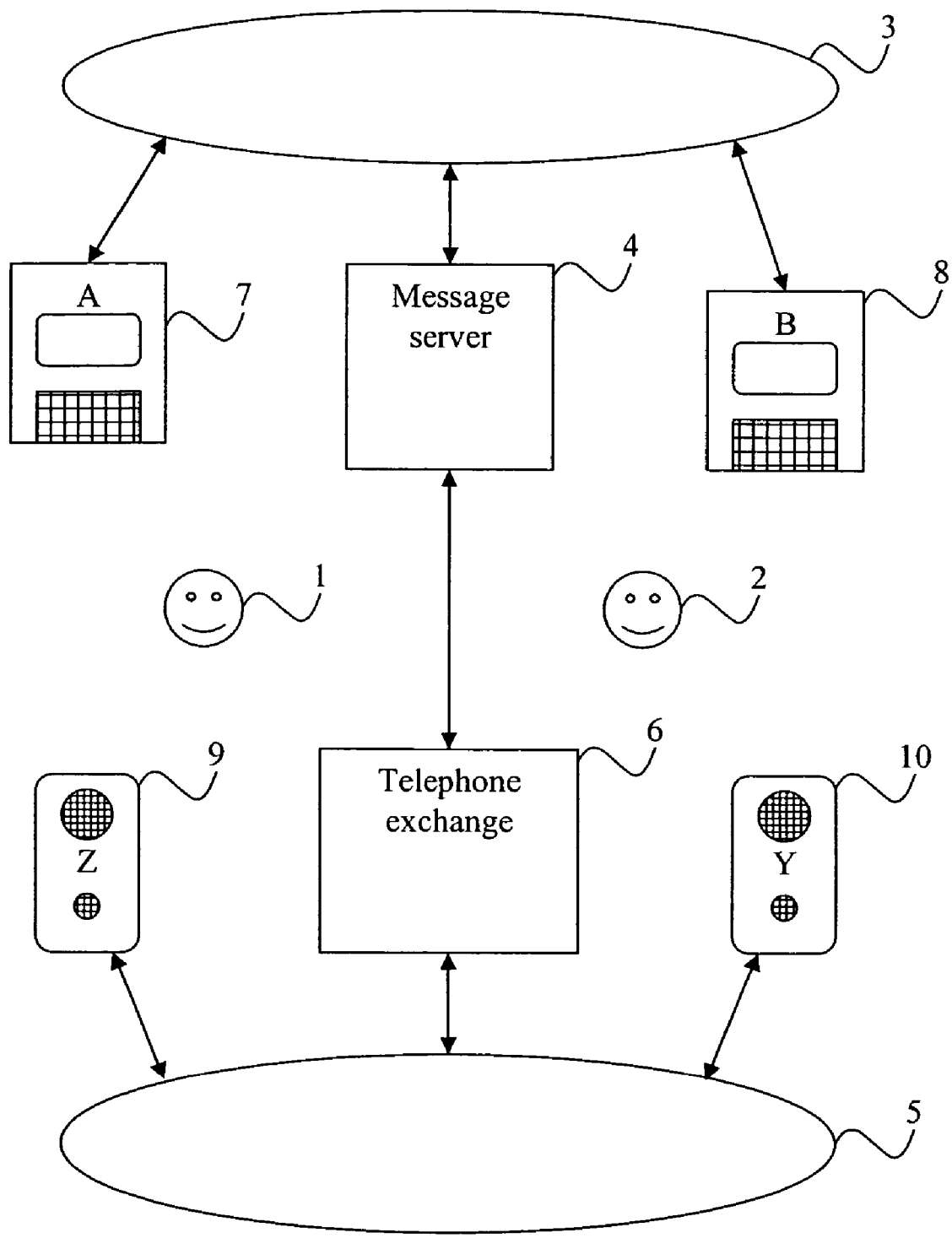
FIG. 1 is a diagram of a system of the invention.

The system represented in FIG. 1 comprises a messaging server 4 and a telephone exchange 6 interconnected by a communications connection that is either a point-to-point connection, at least from the server 4 to the exchange 6, or a network connection, preferably a secure network connection.

The server 4 is of a type (instant messaging, chat room, electronic messaging (e-mail)) known in the art. Devices 7, 8 such as personal computers or any other similar type of equipment having a screen, keypad, mouse and network interface can be connected to the server 4 via the Internet or an Intranet 3.

An instant messaging or chat room application is synchronous in that users 1, 2 connect their respective devices 7, 8 to the server 4 at the same time, essentially in order to dialogue by means of text messages exchanged between two parties in the case of electronic messaging or between two or more parties in the case of a chat room.

An electronic messaging application is asynchronous in that the user 1 produces on his device 7 a message that he sends to the user 2 over the network 3 by means of a connection to the server 4. The message remains on the server 4 until the user 2 connects to it via the network 3.

The exchange 6 is of the type known in the art of Audiotel and teleconference servers and is capable of switching into a direct call between two or more users 1, 2 two or more half-calls to the exchange 6 respectively initiated by the user 1 and the user 2.

The telephone exchange 6 is a node of the telephone network 5 that receives calls sent to it from telephone devices 9, 10 connected to the network 5. The telephone devices 9, 10 consist of mobile telephones, home telephones (including cordless telephones), payphones or any other type of communicating object providing with a microphone and a loudspeaker. Two or more users 1, 2 can communicate orally by means of the devices 9, 10, with the benefit of all the well-known flexibility in terms of the users' locations or movements.

The messaging server 4 comprises means for receiving an invitation to participate in a telephone call between two or more users and for sending users a telephone number dedicated to said telephone call. In addition to the usual server components for communication over the network 3, such as network cards with appropriate drivers, said means essentially comprise a program adapted to execute steps of a method described below with reference to FIG. 2.

The telephone exchange 6 comprises means for managing the validity of the dedicated number and means for connecting telephone devices that call the dedicated number, provided that the dedicated number is valid. In addition to the usual switching components of a telephone network, said means essentially comprise a program adapted to execute steps of a method described below with reference to FIG. 5.

In a first variant, the messaging server 4 comprises means for generating the dedicated number and for sending it to the telephone exchange 6. In this case the exchange 6 comprises means for receiving the dedicated number and its validity conditions. In addition to the usual components for communication from the server 4 to the exchange 6, said means essentially comprise a program adapted to execute steps of a method described below with reference to FIG. 3.

In a second variant, the messaging server 4 comprises means for generating a dedicated number request and sending it to the telephone exchange 6 with validity conditions and means for receiving a dedicated number from the exchange 6. In this case the exchange 6 comprises means for receiving the request and the validity conditions and means for generating the dedicated number and for sending the dedicated number to the server 4. In addition to the usual components for communication between the server 4 and the exchange 6, said means essentially comprise a program adapted to execute steps of a method described below with reference to FIG. 4.

Figure 2:
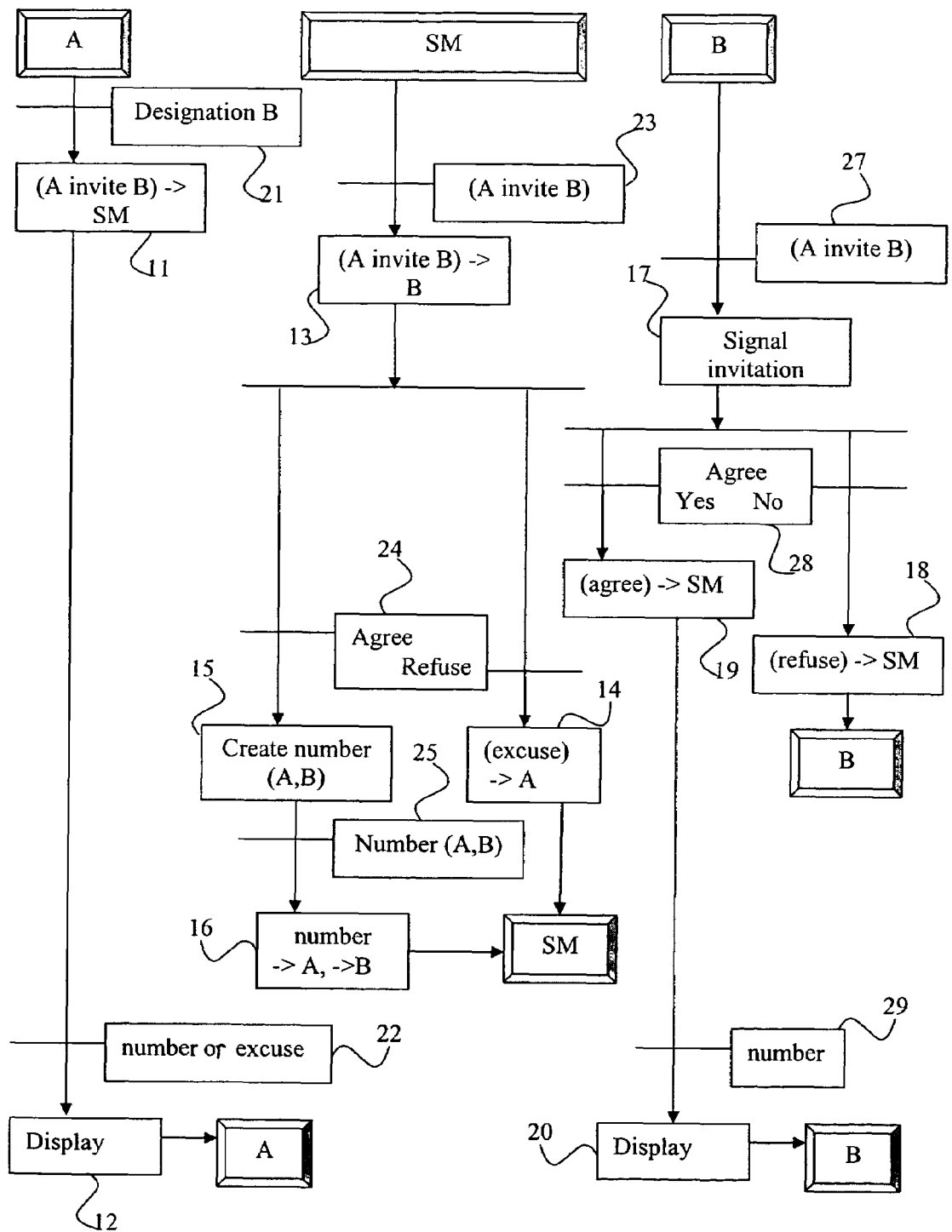
FIG. 2 shows steps of a method of sharing a dedicated telephone number between two or more users.

Referring to FIG. 2, a machine A effects steps 11 to 12 of a method activated by transitions 21 to 22, a machine SM effects steps 13 to 16 of a method activated by transitions 23 to 25, and a machine B effects steps 17 to 20 of a method activated by transitions 27 to 29. The machine A is implemented in one of the devices 7, 8 by one or more processes that execute a program element loaded into random access memory of the device concerned for controlling and monitoring the steps 11 to 12 of a method activated therein. The machine SM is implemented in the messaging server by one or more processes that execute a program element loaded into random access memory of the server 4 for controlling and monitoring the steps 13 to 16 of a method activated therein. The machine B is implemented in the other of the devices 7, 8 by one or more processes that execute a program element loaded into random access memory of the device concerned for controlling and monitoring the steps 17 to 20 of the method activated therein.

The machine SM is integrated into a first messaging application part that is open on the server 4, where it is by default in a standby state, represented in FIG. 2 by a rectangle with a double outline around the letters SM. The machines A, B are integrated into a second messaging application part that is open on the devices 7, 8, where it is by default in a standby state, represented in FIG. 2 by rectangles with a double outline around the letter A and the letter B, respectively. The standby states are so called because the users 1, 2 use or do not use other messaging, exchange of text or other services and do not interact with the method of the invention.

The transition 21 is validated if the machine A detects designation of the machine B to receive an invitation to a telephone meeting. In an instantaneous messaging or chat room application, in which essentially texts are exchanged, the user 1 typically wishes to communicate by telephone with his contact, with the user 2, or with the users present who accept to participate in telephone communication. The user 1 may have many motives: he may wish to enter into voice dialogue without going so far as to reveal more information about himself by giving his telephone number, or he may not have access to the "voice over IP" facility; he may also wish to continue to communicate while moving around, when using his cordless or mobile telephone; he may further wish to converse with the user 2 at the same time as texting a third party in another instant messaging window. It can be confidently predicted that users interacting by the method of the invention will come up with numerous other motives. To enter into telephone communication with the user 2, the user 1 designates on his device 7 the machine B that the user 2 has assigned himself in his device 8 within the current application, for example by clicking an icon on his screen, entering a code on his keypad or in any other appropriate manner.

Validation of the transition 21 triggers step 11 in which the machine A sends the machine SM an "A invite B" message. In the simplest possible embodiment, in which the telephone call begins while the session of the current application is open, this simple message is sufficient. In a more sophisticated embodiment in which the telephone call begins later, after closing the session of the current application, the user 1 also enters a meeting time, and even a meeting date, at which the telephone call begins. The machine A then concatenates the time or date entered into the message sent to the machine SM.

The transition 23 is validated when the machine SM receives an "A invite B" message, where appropriate with the scheduled date and time for the rendezvous.

Validation of the transition 23 triggers the step 13 in which the machine SM sends the machine B an "A invite B" message, where applicable imparting a natural turn of phrase to it. In the simplest embodiment, this simple message is sent as it stands. In the more sophisticated embodiment, the proposed rendezvous date and/or time are integrated into a phrase in natural language, a table or any other form of parameterable presentation.

The transition 27 is validated when the machine B receives an "A invite B" message, where appropriate with the appointed date and time for the rendezvous.

Validation of the transition 27 triggers the step 17 in which the machine B reports the invitation from the user 1 to the user 2. Many signaling means may be used. The machine B may display the received message on the screen of the device 8 or reproduce synthesized sound over the loudspeakers of the device 8. Regardless of the form it takes, the report prompts the user 2 to agree to the rendezvous by writing a certain preformatted phrase, if he wishes, by checking a box on the screen or simply by pressing a predetermined key.

The transition 28 is positively validated if the machine B detects agreement by the user 2 and negatively validated if the machine B detects refusal by the user 2 or the absence of agreement in a predetermined time period.

Negative validation of the transition 28 triggers the step 18 in which the machine B sends a refusal message to the machine SM via the network 3.

Positive validation of the transition 28 triggers the step 19 in which the machine B sends an agreement message to the machine SM via the network 3.

The transition 24 is validated positively if the machine SM receives an agreement message sent by the machine B and validated negatively if the machine SM receives a refusal message sent by the machine B.

Negative validation of the transition 24 triggers the step 14 in which the machine SM sends an excuse message to the machine A via the network 3.

Positive validation of the transition 24 triggers the step 15 in which the machine SM launches a procedure for creating a telephone number specifically dedicated to the telephone rendezvous proposed by the user 1 and accepted by the user 2. Different procedures for creating this telephone number are feasible, two of which are described below with reference to FIGS. 3 and 4. The dedicated number being linked to the dialogue of the machines A and B via the network 3, it is listed as in the form "number (A, B)" in a list of other numbers, if any, initiated from other machines or for other rendezvous, in which case it is associated with an order index.

The transition 25 is validated when the procedure for creating the dedicated number has ended, i.e. when a specific telephone number has been assigned for the telephone meeting.

Validation of the transition 25 triggers the step 15 in which the machine SM sends a message containing the telephone number to the machines A, B of the users 1, 2 who have agreed to the meeting via the network 3.

The transition 22 is validated when the machine A receives a message containing the number sent in the step 15 or an excuse message sent in the step 14.

Validation of the transition 22 triggers the step 12 in which the machine A displays the received message so that the user 1 can either tell, where applicable, that the user 2 has sent a refusal or see the dedicated number that serves as a confirmation of the agreement by the user 2.

The transition 29 is validated when the machine B receives the message containing the number sent in the step 15.

Validation of the transition 29 triggers the step 20 in which the machine B displays the received message so that the user 2 can see the dedicated number.

The method described for two users can be generalized with no particular difficulty to enable a plurality of users to participate simultaneously in the same telephone rendezvous proposed by one of them. The machine B is duplicated so that there are as many machines C as there are invited users. In the machine SM, the step 14 is triggered as many times as the user of a device 8 refuses the invitation, the excuse message then giving a name or a pseudonym of the user originating the refusal. The step 15 is triggered as soon as the user of a device 8 accepts the invitation. The step 15 also counts each machine C that sends an agreement in order to send the dedicated number in step 16 to each machine that sends an agreement message and to store the number of users expected to call the dedicated number to participate in what it is convenient to call a telephone conference. There are many possible variants. For example, an invited user might propose to add another person, in which case the messages transmitted over the network 3 would be enriched accordingly. For example, the message transmitting the dedicated telephone number may contain names or pseudonyms of persons who have accepted the invitation and of persons designated by said designated persons to whom they will transmit the dedicated number in some other manner. The message sent in step 19 is then an "agree with X" message.

Figure 3:
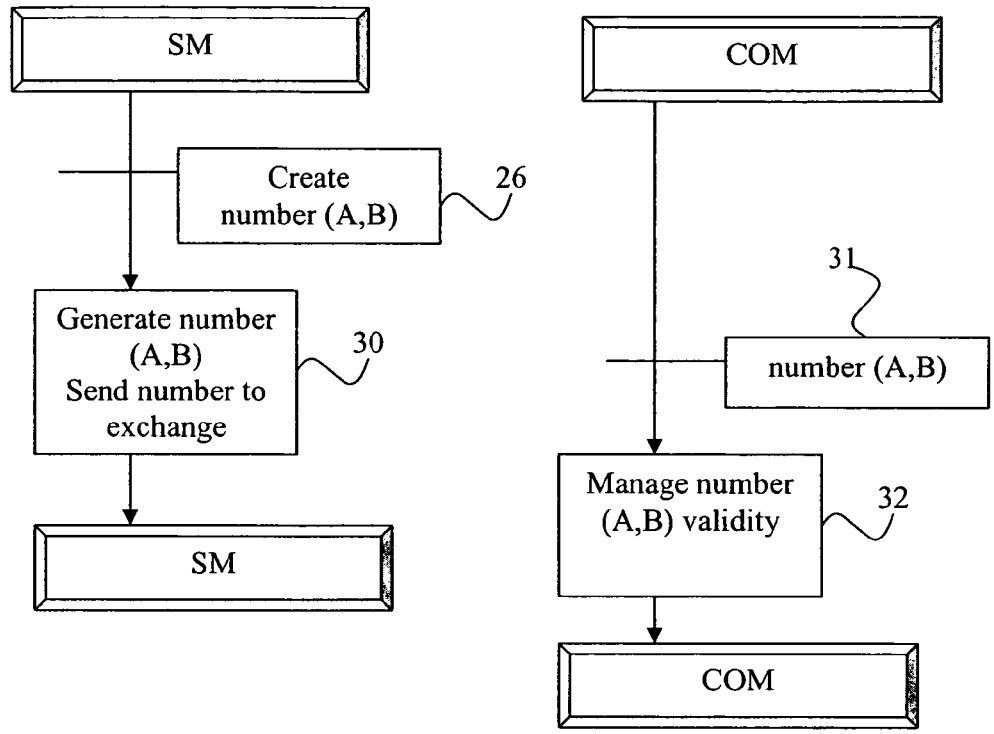
FIGS. 3 and 4 show steps of a method of generating and managing the dedicated telephone number.
Figure 4:
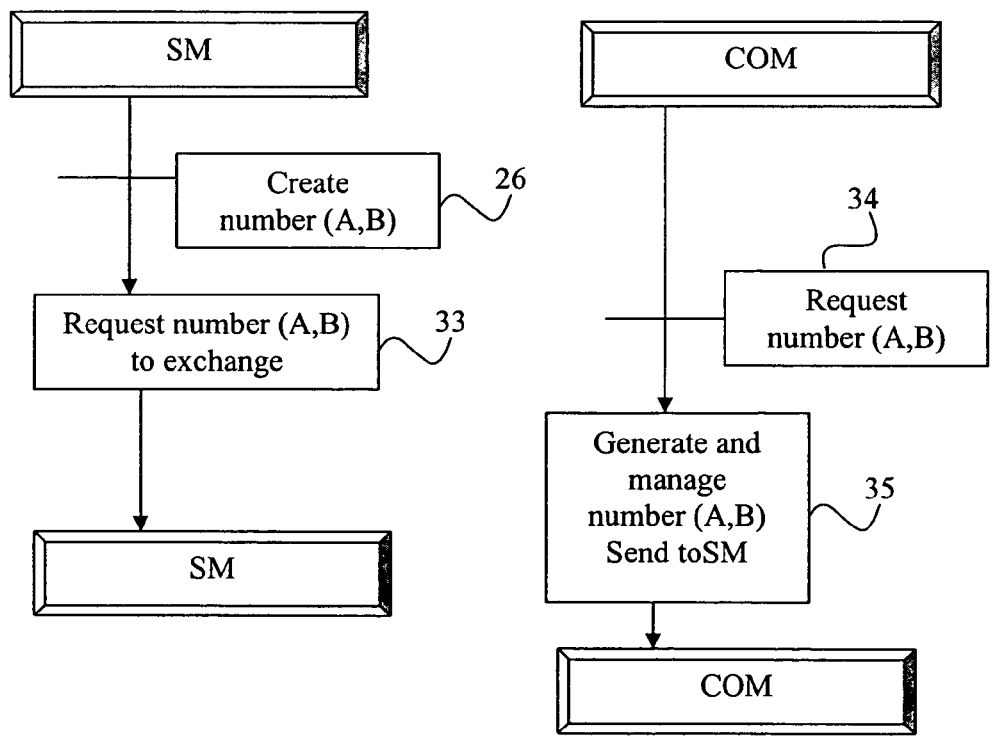

Referring to FIGS. 3 and 4, the transition 26 is validated in the machine SM at the start of the procedure for creating a dedicated number, i.e. by the triggering of the step 15.

Referring to FIG. 3, validation of the transition 26 triggers a step 30 in which the machine SM generates the dedicated number and sends a message containing the number to an active machine COM in the telephone exchange 6. The telephone number is generated in a format compatible with the telephone exchange, for example a six-digit extension to the telephone number enabling the telephone exchange to be called over the network 5. The end of the step 30 validates the transition 25.

The transition 31 is validated when the machine COM receives the message containing the dedicated number and, advantageously, the number of users expected to call that number.

Validation of the transition 31 triggers a step 32 in which the machine COM checks the validity of the dedicated number. In the simplest embodiment, if there is provision for users to call the dedicated number during a session of their messaging application, the number is valid for a predetermined time period or until it is revoked by the machine SM on detecting an end of session.

Referring to FIG. 4, validation of the transition 26 triggers a step 33 in which the machine SM generates a request sent to the machine COM that is active in the telephone exchange 6 in order to obtain a telephone number for a defined number of users expected to call that number.

The transition 34 is validated when the machine COM receives the telephone number request.

Validation of the transition 34 triggers a step 35 in which the machine COM generates the dedicated number in a similar manner to what the machine SM does in step 30, by taking it from a list of numbers or by producing it at random and verifying that it is unique. The machine COM checks the validity of the dedicated number in the same way as in the step 32. The machine COM sends the dedicated number to the machine SM over the network 3 in a message whose reception by the machine SM validates the transition 25.

Figure 5:
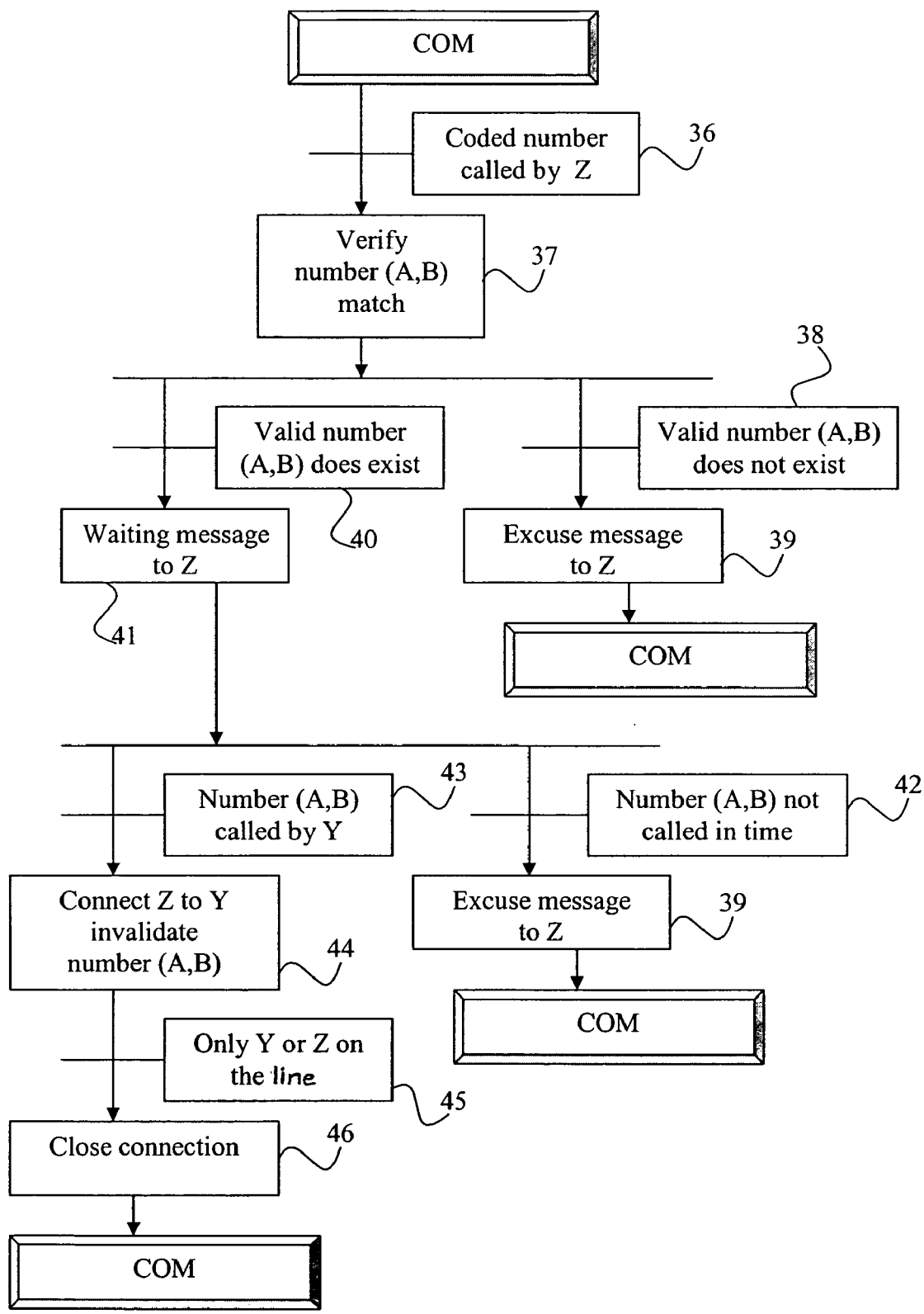
FIG. 5 shows steps of a method of using the dedicated telephone number to set up a telephone call between two or more users.

Referring to FIG. 5, a transition 36 is validated when the machine COM detects a call from the exchange 6 made by a first caller Z. It is immaterial if the first caller is the originator of the telephone equipment 9 or of the telephone equipment 10 on which the user 1 or respectively the user 2 entered a coded number whose first digits address the exchange 6 over the network 5.

Validation of the transition 36 triggers a step 37 in which the machine COM verifies that the coded number matches a valid dedicated number. To avoid using unwanted dedicated numbers, each dedicated number is valid only for a time period including the scheduled date and/or time for the telephone rendezvous.

A transition 38 is validated if there is no valid dedicated number that corresponds to the coded number when said coded number is received.

Validation of the transition 38 triggers a step 39 in which the machine COM sends an excuse message to the caller Z.

A transition 40 is validated if a valid dedicated number exists that corresponds to the coded number when said coded number is received.

Validation of the transition 40 triggers a step 41 in which the machine COM sends a "Please Wait" message to the caller Z.

A transition 42 is validated if the dedicated number is not called again within a time period within the time range.

Validation of the transition 42 triggers a step 39 in which the machine COM sends another excuse message to the first caller Z. The dedicated number is then destroyed, at least for a certain time period, so that it can no longer be used ill-advisedly.

A transition 43 is validated when the machine COM detects a call to the exchange 6 from a second caller Y. The second caller is the originator of the other telephone device 9, 10 on which the user 1 (respectively the user 2) entered a coded number that corresponds to the dedicated number.

Validation of the transition 43 triggers a step 44 in which the machine COM sets up the telephone call between the callers by connecting the two half-calls coming from the callers Z, Y. Note that the users 1, 2 have therefore been able to enter into voice communication without having to exchange their personal numbers, but simply by calling a common number that has been assigned to them and communicated to them automatically. As soon as the machine COM detects that the planned number of parties have entered into communication, the dedicated number is destroyed so that it can no longer be used ill-advisedly, for example to prevent a party intruding intentionally or unintentionally into the telephone conversation.

A transition 45 is validated when the machine COM detects that there is no longer any party Y or Z on the line.

Validation of the transition 45 triggers a step 46 in which the machine COM clears down the telephone connection.

Clearly the invention is not limited to the single embodiment described above, which is more particularly suitable for an instantaneous messaging application. The invention may also be used with advantage in an electronic messaging application, for example.

Assume that a user 1 wishes to invite one or more other users 2 to participate in a telephone rendezvous or conference. In the step 11, he sends an electronic message (e-mail or SMS text message) to each of the other users in parallel. Since this electronic message passes through the messaging server, said server detects an invitation to a telephone meeting. The messaging server detects agreements and refusals in the response electronic message(s) (e-mail(s) or SMS text message(s)). If the messaging server detects one or more agreements, it sends to each user agreeing to participate in the telephone meeting an electronic message (e-mail or SMS text message) containing the dedicated telephone number with the agreed date and time of the rendezvous. Thus each user participating in the telephone conversation as a result of agreeing to the rendezvous can connect thereto by means of any telephone device and without having to reveal their coordinates. This may be beneficial for users who have to participate in business meetings from their home.

We claim:

1. A method of connecting two or more persons by telephone without any person having to give their telephone coordinates, comprising:
   sending, by an inviting person, one or more invited persons a message containing an invitation to communicate directly by telephone, the invitation comprising one of a time and a time and date to communicate directly by telephone;
   in response to the one or more invited persons agreeing, in response to the invitation, to participate in the communication by telephone, automatically creating, by a server, a single telephone number dedicated to connecting the inviting person and the one or more invited persons by telephone;
   broadcasting, by the server, the dedicated single telephone number to the inviting person and to the invited person(s) who have agreed to participate in the communication by telephone; and
   connecting two or more calls using the automatically created dedicated single telephone number thereby preventing the person(s) who have agreed to participate in the communication by telephone from having to give their telephone coordinates.

2. The method according to claim 1, wherein said connecting of two or more calls through to the dedicated single telephone number is effected during a predetermined time period in which the dedicated single telephone number is valid.

3. The method according to claim 1, wherein the dedicated single telephone number is destroyed after use.

4. A system for connecting two or more persons by telephone without any person having to give their telephone coordinates, comprising:
   a messaging server adapted to:
   send to one or more invited persons a message sent by an inviting person and containing an invitation to communicate directly by telephone, the invitation comprising one of a time and a time and date to communicate directly by telephone,
   automatically create a single telephone number dedicated to connecting the inviting person and the one or more invited persons by telephone in response to the one or more invited persons agreeing, in response to the invitation, to participate in the communication by telephone, and
   broadcast the single telephone dedicated number to the inviting person and to the invited person(s) who have agreed to participate in the communication by telephone; and
   an exchange adapted to connect two or more calls using the dedicated single telephone number thereby preventing the person(s) who have agreed to participate in the communication by telephone from having to give their telephone coordinates.

5. The system according to claim 4, wherein the exchange is adapted to control the connection of the two or more calls through to the dedicated single telephone number during a predetermined time period in which the dedicated single telephone number is valid.

6. The system according to claim 4, wherein the exchange is adapted to destroy the dedicated single telephone number after use.

* * * * *